Dec. 15, 1942.  F. R. CONKLIN ET AL  2,304,886
METHOD OF EXTRUSION OF SHEETING
Filed Sept. 27, 1939   2 Sheets-Sheet 1
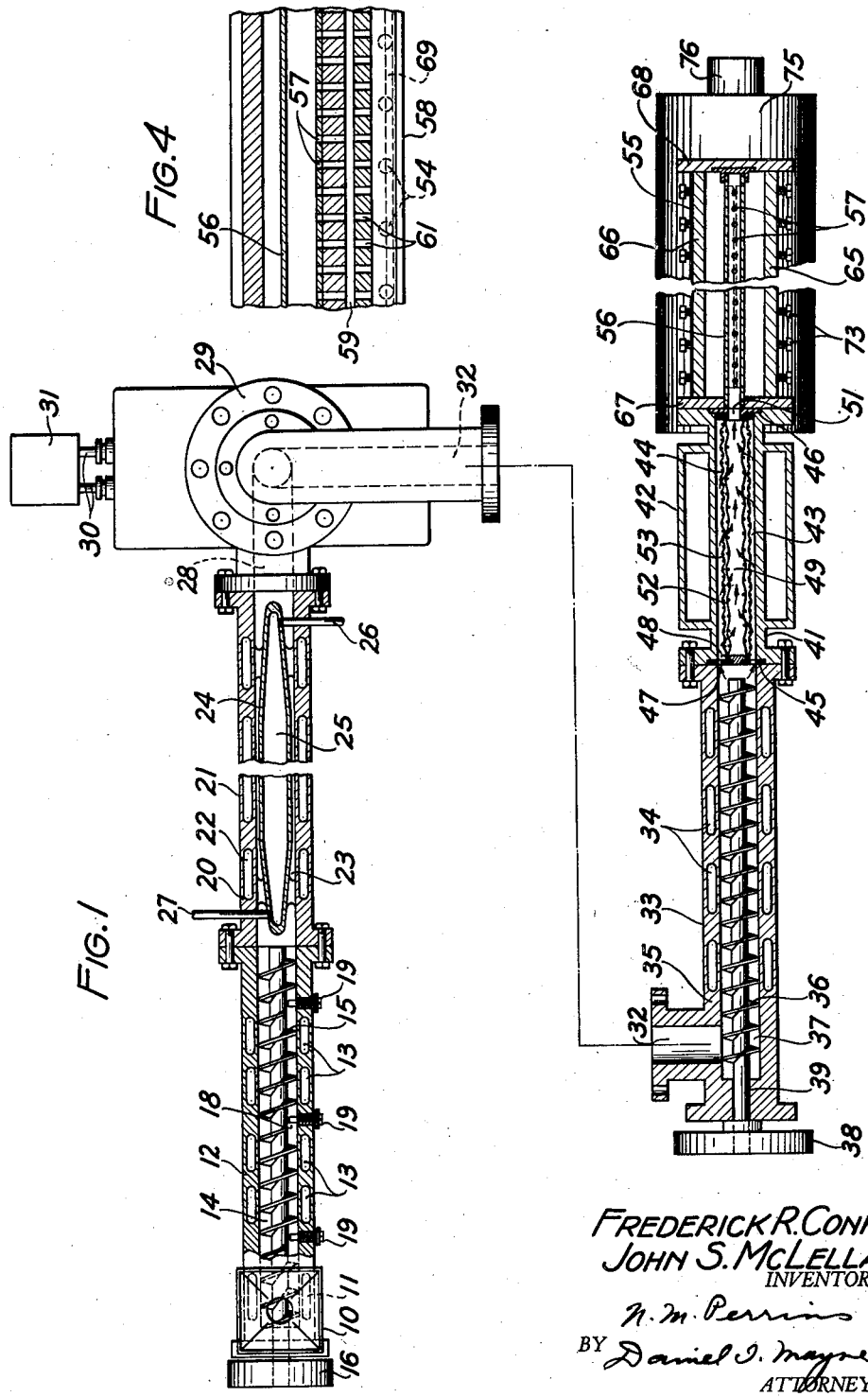
FREDERICK R. CONKLIN
JOHN S. MCLELLAN
INVENTORS
BY
ATTORNEYS Dec. 15, 1942.  F. R. CONKLIN ET AL  2,304,886
METHOD OF EXTRUSION OF SHEETING
Filed Sept. 27, 1939   2 Sheets-Sheet 2
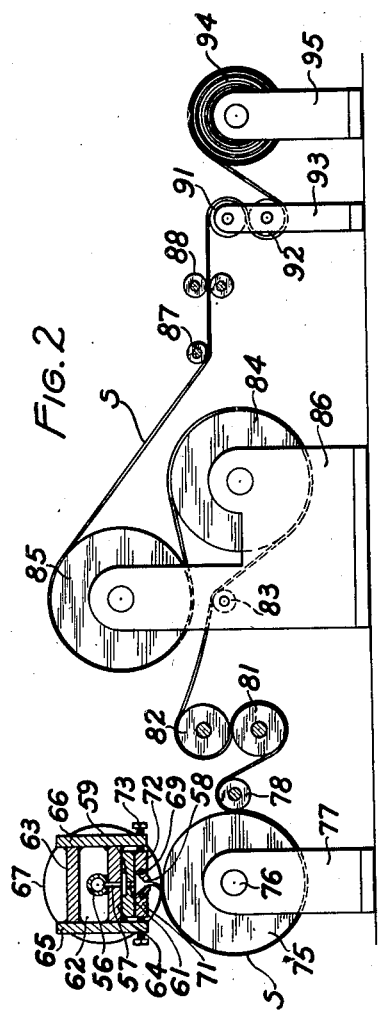
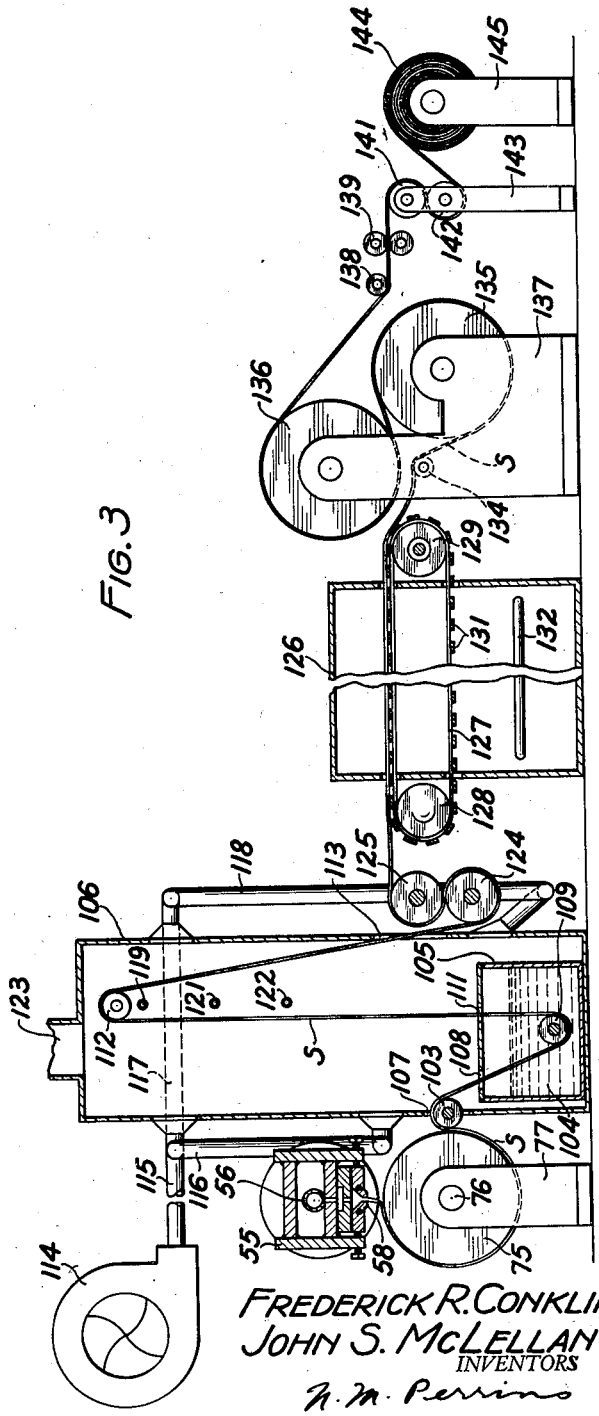
FREDERICK R. CONKLIN
JOHN S. McLELLAN
INVENTORS
BY
ATTORNEYS Patented Dec. 15, 1942

2,304,886

UNITED STATES PATENT OFFICE 2,304,886

METHOD FOR EXTRUSION OF SHEETING

Frederick R. Conklin and John S. McLellan, Kingsport, Tenn., assignors to Eastman Kodak Company, Rochester, N. Y., a corporation of New Jersey Application September 27, 1939, Serial No. 296,834

4 Claims. (Cl. 18—57)

This invention relates to a process for the manufacture of sheeting from organic thermoplastic compositions, such as cellulose mixed organic acid ester compositions, thermoplastic resin composition, such as acetal resins, and in particular to the manufacture of sheeting, suitable for use as the interlayer in laminated glass, from plasticized cellulose acetate butyrate compositions.

Various methods have heretofore been employed for making thermoplastic sheeting for use in the manufacture of laminated glass. A very excellent process for making such sheeting from cellulose acetate compositions is described in the copending application Serial No. 127,664, filed February 25, 1937 now Patent 2,177,660. Another process for processing sheeting made from cellulose acetate compositions is described in the copending application Serial No. 127,663, filed February 25, 1937 now Patent 2,177,659.

In both of these above mentioned applications one of the present inventors, McLellan, is a joint inventor. In the first mentioned process, the cellulose acetate sheet is extruded from a hot die, it is then heat treated to eliminate internal strains, and afterwards hot calendered to produce a sheet of uniform thickness. The second mentioned process also is based on the heat treatment of the themoplastic sheeting to improve its physical characteristics. The point to be made is that in these desirable processes, and in many others of the prior art, the hot extruded sheet is treated in some manner while hot.

These sheets were generally made from single ester derivatives of cellulose such as cellulose acetate and no particular difficulty was experienced in overcoming the natural tendency of the sheet to adhere while hot to the apparatus. In the case of the mixed esters of cellulose as well as the acetal resins, considerable difficulty is experienced in handling the hot extruded sheet. We have found that plastic sheeting containing a base of a cellulose mixed organic acid ester such as cellulose acetate propionate, cellulose acetate butyrate, or others mounted hereinafter, particularly if plasticized with the solvent plasticizers such as diamyl phthalate, dibutyl phthalate or others, presents a very difficult handling problem. Such hot sheeting tends to adhere to the guide rolls and to other surfaces over which it may pass. It also may stick together when wound up unless talc or other materials are employed to reduce the tackiness.

An object therefore of the present invention is an improved process of extruding organic thermoplastic compositions, which are inherently tacky and tend particularly when hot to adhere to various surfaces, whereby such adherence is reduced below the point of substantial adherence.

Another object of the invention is an improved process for the continuous extrusion and treatment of thermoplastic sheeting. Other objects will appear hereinafter.

In accordance with one form of the invention these and other objects are attained by uniformly extruding a hot homogeneously mixed thermoplastic composition thru a die orifice and onto a revolving cold roll. The roll is maintained at a relatively lower temperature than the extruded sheet. The cold roll serves to cool the sheet sufficiently to eliminate substantially the undesirable adherence of the sheet and, therefore, the hot sheet may be removed from the vicinity of the die without the former difficulties caused by the tackiness of the sheet. The cold roll also supports the sheet in the vicinity of the extrusion die and removes it without exerting any tension thereon. The sheet may be further cooled, if desired, by being passed thru a system of cooling rolls designed to cool both surfaces of the sheet and then may be immediately put to use or the cold sheet may be rolled up without difficulties due to adherence.

In accordance with another feature of the invention, the composition may be extruded onto the revolving cold roll and then treated in a liquid bath wherein the surface tackiness of the sheet is further eliminated. The sheet is then conducted thru a drying cabinet to expel the liquid from the surface thereof, and is then conducted thru a second drying or conditioning chamber where any residual liquid that may remain on the sheet is removed. The sheet may then be passed thru a system of cooling rolls to remove any heat accumulated by the sheet during the drying processes and then may be trimmed and rolled up in a suitable roll.

The invention will be more clearly understood from the following detailed description with reference to the attached drawings in which:

Fig. 1 is a plan view, chiefly in section, showing the elements of our improved apparatus for producing thermoplastic sheeting up to the point where it is extruded onto the cold roll.

Fig. 2 is an elevational view of one form of the apparatus showing the extrusion of the sheet onto the roll and its subsequent progress to the windup roll.

Fig. 3 is an elevational view, part of the apparatus being in section, of an alternative form of the apparatus showing the extrusion of the sheet onto the roll, its further treatment, and its progression to the windup roll.

Fig. 4 is an elevational view in section showing the construction of the extrusion head and die. In Figs. 2 and 3 there is also shown an end sectional view of the die head.

The apparatus, as will be more or less apparent from these drawings, comprises a feed screw, a preheating cylinder, a "Quimby" pump, a stuffer screw, a straight slot die, a cold casting roll, guide rolls, trimming knives and a windup roll.

Referring to Fig. 1, which represents the extrusion apparatus, up to the extrusion of the sheet onto the cold roll, there is shown a hopper 10 in which suitably mixed plastic granules, or the like, may be introduced. The hopper 10 is mounted above a screw conveyor assembly comprising a casing 12 having a cooling jacket 11 which is cooled with cold water, and a heating jacket 13 positioned in the walls thereof, maintained by steam at a temperature of from 120° C. to 140° C., a chamber 14 positioned therein and a screw 15 rotatably mounted in the chamber 14 and capable of being turned by means of pulley 16. The screw 15 has a plurality of slots 18 cut in its flights which cooperate with a plurality of lugs 19 to break up the plasticized granules and to cause the screw to feed continuously without any choking up.

Material introduced into the hopper 10 enters the chamber 14 where it is first cooled by the cooling jacket 11; the rotation of the screw 15 will carry the material thru the heated section of the screw conveyor chamber during which it is heated and changes from a dough like stage to a thermoplastic mass.

From the screw conveyor chamber the plastic material will be forced thru a preheater 20 which comprises a casing 21 having heating jackets 22 positioned in the walls thereof, a chamber 23 positioned within the casing 21, and a heated core 24 positioned in the chamber 23. Heating fluids can be introduced into the hollow center 25 of device 24 thru inlet tube 26 and outlet tube 27. The core and the cylinder are heated to temperatures of from 150° C. to 166° C. In this device the onflowing plastic material is divided to a narrow width and is therefore uniformly preheated while passing between the walls of the casing and the internal core 24. The preheater and core are approximately 5 feet long.

On leaving the preheater 20 the heated material will be forced thru inlet 28 into the "Quimby" pump 29 which is operated by a prime mover 31 thru drive shafts 30. The "Quimby" pump is heated by means of a heat jacket (not shown) to temperature of 140° C. to 160° C. In this pump 29, the thermoplastic material is drawn in by rotating vanes (not shown) and is thoroughly mixed, and then forced out of the top of the pump thru outlet 32 into the heated screw stuffer 33 thru inlet 32. This screw stuffer 33 is heated by passing steam thru the heating jacket 34 contained in the stuffer walls 35. A screw 36 is suitably mounted in the stuffer chamber 37 and is turned by suitable motive power thru its pulley 38 and shaft 39. The screw 36 may also be internally heated as is well known in the art. The temperature employed will be in the range of 140° C. to 160° C.

From screw stuffer 33 the heated material is forced into the screening device 41 which has a heat insulating jacket 42 placed therearound. The screening device has a cylindrical chamber 43 in which is placed in concentric position a screen assembly 44. The screen assembly is mounted on circular end support members 45 and 46. Member 45 has an annular aperture 47 therein near the edge of the member while member 46 has a circular orifice 51 in its center portion. As will be clear from the drawings the plastic material is forced thru the annular aperture 47 and along the outside of the screen in the space 48 which soon fills. The continuous action of the stuffer screw 36 will then force the material in space 48 thru the screen into space 49. The screen will subdivide and homogenize the material which will flow thru space 48 and out of orifice 51. The screen assembly 44 may be made of a heavy mesh backing screen 52 and a fine mesh screen 53 placed thereover.

From the screening device the plastic flows into the extrusion die assembly 55. The construction of the die assembly may be more clearly understood by also referring to Fig. 2 where there is shown an end elevation view in section of the die assembly and to Fig. 4 which is a side elevational view in section. The die assembly 55 comprises a material conduit 56 into which the material is forced by the action of stuffer screw 36. A plurality of slots 57 conduct the material to the extrusion die 58 thru a compacting chamber 59 and slot 61. The conduit 56 is positioned in a steam heated chamber 62 which is formed by walls 63, 64, 65, and 66, and end walls 67 and 68. This is heated to 140 to 160° C. The die blocks 71 and 72 are positioned and suitably adjusted by bolts 73. As will be apparent, the width of the die orifice may be adjusted by these bolts. The temperature of the orifice may be suitably controlled by passing fluids thru the passages 69. This temperature is maintained at 150 to 160° C.

The plastic material which is forced out of the die 58 in the form of a sheet S will then contact the hollow cold roll 75 which is suitably cooled by means not shown. The roll 75 is mounted on support 77 thru its shafts 76. The temperature of the roll 75 is preferably maintained within 20° to 22° C. The roll 75 may be adjusted to be relatively near or remote from the die orifice 58. Preferably it is maintained at a distance of 1 to 3 inches below the die orifice.

The sheet S will tend to cling to the cold roll 75 and will pass around the roll to the take off roll 78 when it will be stripped from roll 75. The sheet then passes between drive rolls 81 and 82. From this point the sheet travels over guide roll 83 and over the large cooling rolls 84 and 85 and which are mounted on support 86. The sheet then passes under guide roll 87 thru the edge trimmer 88, thru the driving rolls 91 and 92 mounted on support 93, and to the windup roll 94 which is mounted on support 95.

The alternative method and apparatus for treating the extruded sheet is shown in Fig. 3. The same extrusion die assembly 55 is employed as that shown and described in connection with Fig. 2.

The sheet S is uniformly extruded from the die 58 onto the rotating cold roll 75. The sheet is removed from the roll 75 by roll 103 and enters a treating bath 104 contained in covered receptacle 105 which is positioned in heating cabinet 106. The sheet passes into the heating cabinet thru slot 107 and into the treating bath receptacle 105 thru slot 108 and is passed around the guide roll 109 and leaves thru slot 111. The sheet then is drawn vertically thru the heating cabinet 106 and over guide roll 112 and thence leaves the cabinet thru slot 113. The bath 104 contains a volatile solvent which is subsequently expelled from the sheet when it leaves the bath by the heat in the cabinet 106. Heated air is blown into the cabinet 106 by blower 114 thru conduits, 115, 116, 117, and 118 as well as thru air jets 119, 121, 122. The air leaves the cabinet primarily thru outlet 123.

The sheet leaving the cabinet thru slot 113 passes between drive rolls 124 and 125 and thence into a conditioning cabinet 126 which is equipped with a conveyor to support the sheet. The conveyor passes around pulleys 128 and 129 and is constructed with wooden slats 131. A steam heating coil 132 is positioned in the cabinet to furnish the heat to remove any residual solvent remaining on the sheet. The sheet then passes over guide roll 134 and thence thru the cooling roll system comprising rolls 135 and 136 which are mounted on support 137. The sheet then passes under guide roll 138 and thru the edge trimming device 139 thru driven rolls 141 and 142 mounted on support 143 and is wound up on roll 144.

It will be understood that the various moving parts of the apparatus are operated in proper synchronism so that a continuous extrusion and treatment of the sheet is possible without subjecting the sheet to undue strains.

While the process of the present invention can be employed to form thermoplastic sheeting from various materials and especially those which are tacky when extruded, the invention is particularly suited for the production of cellulose acetate butyrate sheeting.

The preferred cellulose acetate butyrate employed as the base of the composition may be described as a stable organic acid ester of cellulose containing 30 to 55% butyryl having a viscosity of 5 to 75 seconds (1 part in 4 of acetone) and 1 to 2 free hydroxyls per 24 carbon atoms in the cellulose unit.

Such high butyryl cellulose esters may be prepared as described in Gardner Patent 2,113,301 of April 5, 1938, or as described in the Malm and Kirton application referred to below. The esters are preferably stabilized in accordance with the process disclosed and claimed by Malm and Kirton in their application Serial No. 254,492 filed February 3, 1939.

It is desirable that the ester be one which has been stabilized in accordance with the Malm and Kirton process, or is one which has a stability which is equivalent to that of esters prepared according to that process (having a char point of at least 260° C.).

An ester, which has been found to be particularly satisfactory is one having a butyryl content of 35 to 38%, substantially the remainder of the acyl being acetyl which has been hydrolyzed approximately 1/3 of the way down to the diester and which has a char point of at least 280° C.

The plasticizers suitable for use in forming the composition are the stable, high boiling low vapor pressure, moisture resistant plasticizers which plasticizers are substantially permanent in their plasticizing effect within the usual range of atmospheric temperature (typified by 0° to 70° and 120° F.).

Various plasticizers may be employed for example such as dibutyl phthalate, diamyl phthalate, di-2-ethyl butyl, di-2-ethyl butyl adipate, dibutyl sebacate, diamyl sebacate, di-2-ethyl butylsebacate. The plasticizers may be employed in amounts of 50 to 100 parts per 100 parts of cellulose ester.

If desired, other plasticizers may be mixed with the plasticizers listed, to give a mixed plasticizer having suitable characteristics. For instance, a mixture of equal parts of dibutyl sebacate and triphenyl phosphate may be employed as the plasticizer with good results. The plasticizer should be one which in the designated proportion in a sheet .025" thick of stable high butyryl cellulose acetate butyrate as defined herein, such as the interlayer with glass of standard quality, is capable of resisting the fall of a ½ lb. steel ball from a height of 15 feet.

While various methods of mixing the acetate butyrate and plasticizer may be employed we have found the two following methods quite suitable to produce a uniformly plasticized composition.

*Example I*

| | Parts |
|---|---|
| Cellulose acetate butyrate | 100 |
| Diamyl phthalate | 82 |

The mixing operation is carried out in a jacketed sigma blade type mixer of the type described in the Palmer Patent 2,150,939 of March 21, 1939. The cellulose acetate butyrate and the diamyl phthalate are cooled to room temperature and are added to the mixer. They are thoroughly mixed at a temperature of 15 to 20° C. this temperature being maintained by circulating cold water through the mixer jacket. The flow of water is then stopped and the mixer is intermittently agitated until the temperature of the mix rises to room temperature. Hot water is then circulated through the mixer jacket and the mixer is intermittently operated. The mix is finally cooled to room temperature by passing cold water thru the jacket with intermittent agitation.

*Example II*

| | Parts |
|---|---|
| Cellulose acetate butyrate | 100 |
| Dibutyl phthalate | 77½ |

The mixing of this composition is conducted in the same type of mixer as mentioned above in Example I. The acetate butyrate is added to the mixer at room temperature and water at a temperature of 15–20° C. is circulated thru the mixer jacket. Agitation is then commenced and the plasticizer is sprayed into the mixer until a homogeneous mix is attained. The temperature is permitted to rise to produce a plasticized mix.

It will be noted in these mixing processes no volatile solvents, i. e. low boiling solvents such as acetone are employed to cause the plasticizer to commingle with the base plastic material, or for any other reason. Preferably no volatile solvents are employed in making any of the compositions we employ since we have found that the presence of residual solvents in the composition results in "blowins" in the laminated glass it being substantially impossible to remove all of the included solvents. However, the instant process is not limited to the extrusion of non-volatile solvent containing materials even though a superior sheet is produced from such compositions.

The composition obtained by either of these mixing processes is in a dough stage at the end of the mixing operation. The homogeneously mixed dough is then broken up into small pieces or granulated and these pieces or granules may then be fed into the apparatus described above.

As previously suggested various thermoplastic resin base compositions may also be employed according to our improved process to form thermoplastic sheeting for laminated glass. We have found that thermoplastic resins which may be broadly identified as polyvinyl acetal resins, or polyvinyl acetaldehyde acetal resins, or mixed polyvinyl acetal resins, or polyvinyl maleyl ester lactone resins, are particularly adaptible as base resin materials from which sheeting suitable for use in laminated glass can be made.

An example of a suitable polyvinyl acetal resin is that known by the trade name "Vinylite X," which we understand to be a polyvinyl butyraldehyde acetal resin containing a hydroxyl group content equivalent to about 20% by weight, of polyvinyl alcohol.

An example of a polyvinyl acetal resin is that known by the trade name "Formalvar" which appears to be a polyvinyl formaldehyde acetaldehyde.

The resin known by the trade name "Alvar" is representative of a polyvinyl acetaldehyde acetal resin suitable for use in our process. An example of a polyvinyl maleyl ester lactone resin is butyl maleate vinyl acetate.

In addition to these resins other thermoplastic resins which do not have too high softening points may be employed.

These resins may be plasticized with the dialkyl phthalate plasticizers, such as dimethyl, diethyl, dipropyl and diamyl phthalates, alkyl sebacates, such as dibutyl sebacate. Tripropionin, methoxy ethyl phthalate, dimethyl succinate, dimethyl and dibutyl maleate may also be employed.

Typical examples of plasticized resin compositions are the following:

*Example III*

| | Parts |
|---|---|
| "Vinylite X" | 100 |
| Dimethyl phthalate | 65 |

*Example IV*

| | Parts |
|---|---|
| "Vinylite X" | 100 |
| Diethyl phthalate | 65 |

*Example V*

| | Parts |
|---|---|
| "Formalvar" resin | 100 |
| Dibutyl phthalate | 60 |

*Example VI*

| | Parts |
|---|---|
| "Alvar" resin | 100 |
| 50% dimethyl phthalate } 50% dimethyl sebacate } | 65 |

*Example VII*

| | Parts |
|---|---|
| "Vinylite X" | 100 |
| Dibutyl sebacate | 49 |

These formulas can be mixed in a sigma blade mixer, the temperature being kept at room temperature or below during the mixing as described previously. The extruding temperatures will be about 130 to 140° C.

Our process for making thermoplastic sheeting will be more clearly understood from the following description of forming a sheet from the cellulose acetate butyrate composition disclosed in Example I.

Granules of the composition are regularly introduced into hopper 10 of the apparatus by an automatic feeding device (not shown). From the hopper 10 the granules flow into the cold end of the screw stuffer from which they are gradually transferred by the screw 15 thru the stuffer chamber, 14. During this transfer the granules are changed by the heat and pressure in the stuffer to a thermoplastic mass. The granules are heated in the stuffer from 120 to 140° C. The temperature of the mass is raised in the preheater 20 to about 140 to 160° C. In the preheater 20 the onflowing plastic is forced by the action of screw 15 around the heated core 24 and is, therefore, exposed in thin cross section to heat from both the jacket 22 and core 24.

The continued action of screw 15 forces the plastic thru the preheater 20 and into the "Quimby" pump 29 which is also maintained at a temperature of 140 to 160° C. The vigorous mixing action of this pump assures a very homogeneous composition. The pump 29 forces the plastic into the screw stuffer 33 which is also maintained at a temperature of 140 to 160° C. The screw stuffer forces the plastic into the screening device 41 where it is further comminuted and any foreign matter separated. The continuous action of the screw then forces the plastic into the extrusion die assembly 55 thru orifice 51, (see Figs. 2 and 3). The die assembly 55 is maintained at a temperature of from 140 to 160° C. The plastic material, referring to Fig. 2, is forced out of conduit 56 thru the plurality of slots 57 into the compacting chamber 59; it then flows thru slot 61 to the extrusion orifice 58 from which it is continuously extruded in the form of a thin sheet S.

The sheet S is immediately picked up on the cold roll 75 which is at such a short distance from the orifice that the weight of the length of the extruded sheet between the orifice and cold roll is less than that which would tend to stretch the sheet.

The cold roll 75 which is maintained at about 20° C. tends to chill the surface of the sheet and greatly reduces its adherence. However, it will tend to stay on the roll 75 and be carried around to roll 78 at which point it is sufficiently cooled to be easily stripped off roll 75. Roll 78 is a free turning roll and the sheet is drawn thereover by the action of drive rolls 81 and 82 which are driven at a rate less than that which will tend to stretch the sheet. From the drive roll the sheet is passed over the guide roll 83 and then over cold rolls 84 and 85 which cool opposite sides of the sheet. This final cooling will assure that the temperature of the sheet is below the adherence point. The sheet is then trimmed to a desired width by trimmer 88 and wound on roll 94. Drive rolls 91 and 92 serve to draw the sheet thru the trimmer 88.

Referring to Fig. 3 the alternative method of treating the extruded sheet will be described.

The sheet S is extruded onto the roll 75 as heretofore described where it is chilled and removed from the roll 75 by roll 103. It is then drawn into the solvent bath 104 when it passes around freely turning roll 109. The action of the solvent on the cellulose acetate butyrate sheeting produces a white and somewhat roughened sheet which is not tacky at normal temperatures. When, however, this sheeting is pressed between glass plates in the laminating operation, the sheeting becomes highly transparent. Neither the haze value or the result of the break tests are affected by the solvent treatment.

As the sheet reaches the bottom of the bath, it is very soft and subject to undesirable roughening and consequently the guide roll 109 must be mounted to turn freely so that no slippage of the sheet will occur.

As the sheet emerges from the bath 104 its surface is very soft due to the action of the solvent and in order to prevent wrinkling, it is desirable that the wet sheet touch nothing until the preliminary drying has been completed. The sheet is therefore drawn vertically from the bath over the supporting roll 112 in heating cabinet 106, which may be eight to ten feet above the bath. This distance will vary with different types of sheeting and solvent baths.

The preferred solvent for use in the bath is methanol, however, the following solvents and solvent combinations may be employed.

|  | Per cent |
|---|---|
| (1) Methyl acetate. | |
| (2) Ethanol | 53 |
| Acetone | 37 |
| Water | 10 |
| (3) Methyl ethyl ketone | 80 |
| Water | 20 |
| (4) Methanol | 59 |
| Acetone | 35 |
| Water | 6 |
| (5) Acetone | 90 |
| Water | 10 |
| (6) Methanol | 90 |
| Toluene | 10 |
| (7) Isopropy alcohol | 85 |
| Water | 15 |

Hot air from pipes 115, 116, 117, 118, 119, 121 and 122 will drive off the major portion of the solvent contained on the sheet and the solvent vapors will be removed through vent 123 by a suction line, not shown.

The sheet leaves the cabinet thru opening 113 and passes thru drive rolls 124 and 125 which serve to draw the sheet thru the cabinet 106. The sheet is conducted on the endless conveyor 127 thru the heated conditioning cabinet 126. This conditioning cabinet may be 30 feet long. The temperature is maintained between 50 to 60° C. by the heating unit 132, and this treatment will remove any residual solvent traces remaining on the sheet. From the conditioner 126 the sheet is passed over cooling rolls 135 and 136, thru the rotary trimmers 139, draw rolls 141 and 142 and is wound up on spool 144.

By employing these methods, we have been successful in producing sheets of the above described materials without the undesirable features heretofore experienced when using processes of the prior art.

What we claim is:

1. The method of forming a thermoplastic sheet from a thermoplastic composition which is particularly tacky and adherent when hot, which comprises uniformly extruding the hot composition through a die to form a sheet, permitting the formed sheet to contact freely a moving cooling surface and adhere thereto, moving said surface at a rate substantially equal to the extrusion rate whereby substantially no tension is exerted on the sheet, stripping the sheet from the surface when it has been cooled to a point below which it exhibits substantial adherence to the surface, further lowering the adherence of the sheet by passing it through a bath containing a solvent for the sheet, heating the sheet to remove any solvent remaining thereon, and further cooling the sheet to a point below which it exhibits substantial adherence tendencies.

2. The method of forming a thermoplastic sheet from a plasticized cellulose acetate butyrate composition which is particularly tacky and adherent when hot, which comprises uniformly extruding the hot composition through a die to form a sheet, permitting the forming sheet to contact freely a moving cooling surface and adhere thereto, moving said surface at a rate substantially equal to the extrusion rate, whereby substantially no tension is exerted on the sheet, stripping the sheet from the surface when it has been cooled to a point below which it exhibits substantial adherence to the surface, further lowering the adherence of the sheet by passing it through a bath containing a solvent which will attack the surface of the sheet, heating the sheet to vaporize the solvent from the surface of the sheet, conducting the sheet while it is supported without substantial tension being exerted thereon through a heated conditioning chamber wherein any remaining solvent is removed, and again cooling the sheet.

3. The method of forming a thermoplastic sheet from a composition containing cellulose acetate butyrate and dibutyl sebacate which is particularly tacky and adherent when hot, which comprises uniformly extruding the hot composition through a die to form a sheet, permitting the forming sheet to contact freely a moving cooling surface and adhere thereto, moving said surface at a rate substantially equal to the extrusion rate, whereby substantially no tension is exerted on the sheet, stripping the sheet from the surface when it has been cooled to a point below which it exhibits substantial adherence to the surface, further lowering the adherence of the sheet by passing it through a bath containing a solvent which will attack the surface of the sheet, heating the sheet to vaporize the solvent from the surface of the sheet, conducting the sheet while it is supported without substantial tension being exerted thereon through a heated conditioning chamber wherein any remaining solvent is removed, and again cooling the sheet.

4. The method of forming a thermoplastic sheet from a plasticized cellulose organic mixed acid ester composition which is particularly tacky and adherent when hot, which comprises uniformly extruding the hot composition through a die to form a sheet, permitting the forming sheet to contact freely a moving cooling surface and adhere thereto, moving said surface at a rate substantially equal to the extrusion rate, whereby substantially no tension is exerted on the sheet, stripping the sheet from the surface when it has been cooled to a point below which it exhibits substantial adherence to the surface, further lowering the adherence of the sheet by passing it through a bath containing a solvent for the sheet, heating the sheet to remove any solvent remaining thereon, and further cooling the sheet to a point below which it exhibits substantial adherence tendencies.

FREDERICK R. CONKLIN.
JOHN S. McLELLAN.